UNITED STATES PATENT OFFICE.

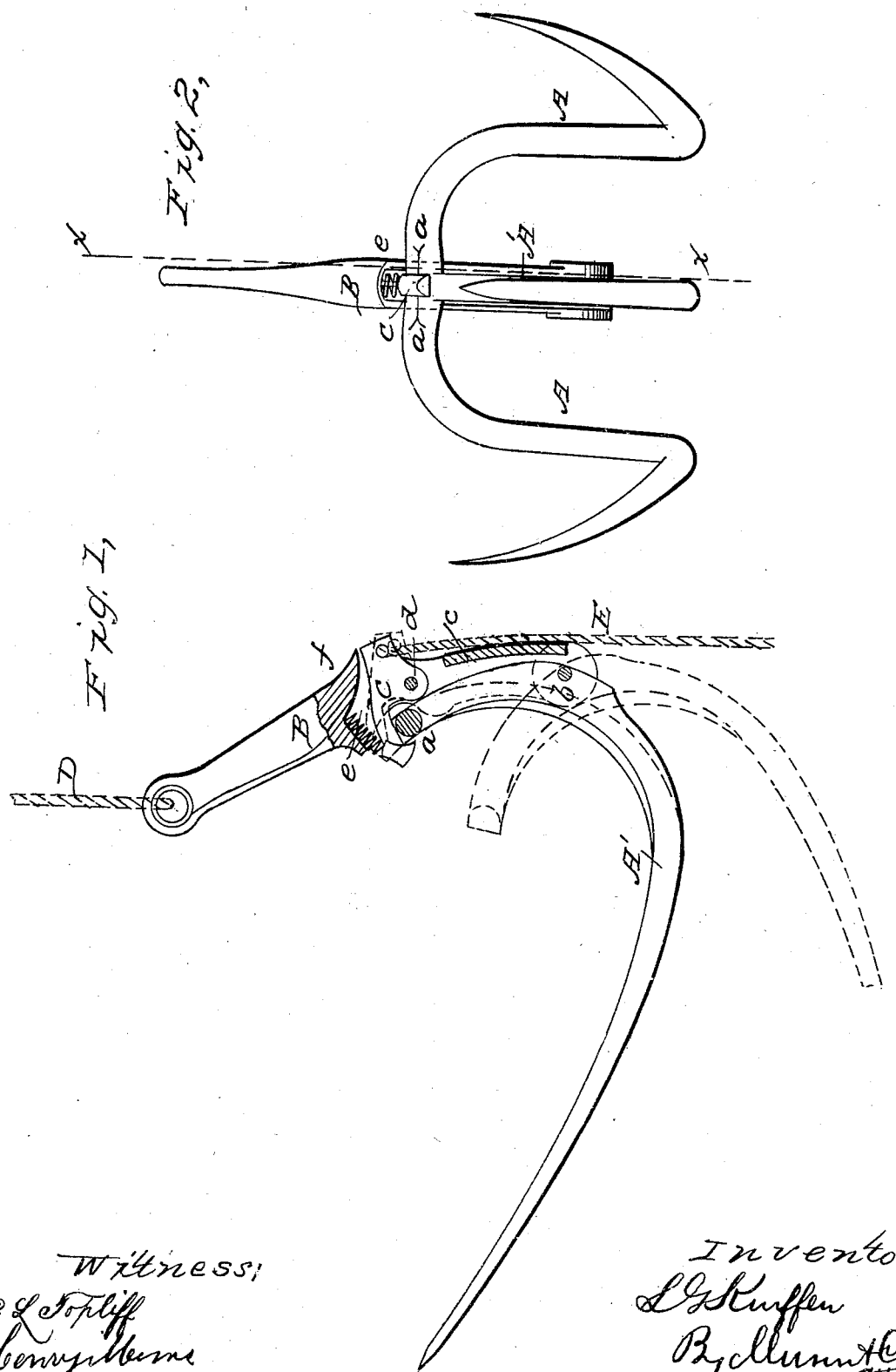

L. G. KNIFFEN, OF WORCESTER, MASSACHUSETTS.

IMPROVEMENT IN HORSE HAY-FORKS.

Specification forming part of Letters Patent No. 44,805, dated October 25, 1864.

*To all whom it may concern:*

Be it known that I, L. G. KNIFFEN, of Worcester, in the county of Worcester and State of Massachusetts, have invented a new and Improved Horse Hay-Fork; and I do hereby declare that the following is a full, clear, and exact description thereof, which will enable others skilled in the art to make and use the same, reference being had to the accompanying drawings, forming a part of this specification, in which—

Figure 1 is a side sectional view of my invention, taken in the line $x$ $x$, Fig. 2; Fig. 2, a front view of the same.

Similar letters of reference indicate like parts.

This invention relates to an improvement in that class of horse hay-forks which are constructed wholly of metal; and it consists in combining a handle and catch of novel construction with the tines of the fork in such a manner that several advantages are obtained over the ordinary forks now used, a premature or casual tipping of the fork being prevented, and a very simple, cheap, and durable fork obtained, and one which may be manipulated with the greatest facility.

The fork is constructed with three tines, A A A', curved in the usual manner, and constructed of iron with steel points, or wholly of steel, the butts or shanks $a$ $a$ of the two side tines, A A, being curved and united, and having the central tine, A', projecting from them at their junction.

B is the handle, of cast-iron, the lower end of which is fitted on the central tine, A', and is secured to it by a pivot-bolt, $b$. The lower part of the handle B is cast with a recess, $c$, to receive the upper part of the central tine, A', when the handle is shoved upward in contact with the fork, as shown clearly in Fig. 1.

C is a catch, which is fitted in the handle B, and works on a pivot, $d$, said catch having a spring, $e$, bearing against its inner end to keep the catch over the inner part of the fork, and cause the latter to be held in a working position, as shown in tint in Fig. 1. The handle is cast with a projection, $f$, which extends over the outer end of the catch, and prevents the latter being acted upon by coming in contact with a beam, so as to release the fork. This is a contingency which frequently occurs with the ordinary forks, and is a great annoyance. The handle extends some distance above the fork, and has the hoisting-rope D attached to it, a cord, E, being connected to the outer end of the catch C.

The fork is arranged with a rope and pulleys, so as to be operated by a horse in the usual manner, and when the loaded fork is elevated to the desired height the operator pulls the cord E, and thereby actuates the catch C and releases the fork, which tilts under its own gravity and that of the load, and causes the latter to be discharged from it.

The spring $e$ is a spiral one, and is fitted in the upper part of the recess $c$ above the catch C, as shown clearly in Fig. 1.

I do not claim broadly a spring-catch fitted in the handle of a horse hay-fork for holding the latter in proper position to retain its load; but

I claim as new and desire to secure by Letters Patent—

The handle B, cast with a recess, $c$, at its lower part, and with a hood projection, $f$, and attached to the central tine, A', of a three-tined fork, as described, in connection with the catch C and spring $e$, all arranged to form a new and improved horse hay-fork, as described.

L. G. KNIFFEN.

Witnesses:
J. HENRY HILL,
H. C. RICE.